(12) United States Patent
Masfaraud et al.

(10) Patent No.: US 7,923,952 B2
(45) Date of Patent: Apr. 12, 2011

(54) DEVICE FOR CONTROLLING POLYPHASE ROTATING MACHINE

(75) Inventors: Julien Masfaraud, Paris (FR); Hugues Doffin, Creteil (FR); Farouk Boudjemai, Marcoussis (FR)

(73) Assignee: Valeo Equipements Electriques Moteur, Creteil (FR)

( * ) Notice: Subject to any disclaimer, the term of this patent is extended or adjusted under 35 U.S.C. 154(b) by 390 days.

(21) Appl. No.: 12/161,054

(22) PCT Filed: Jan. 15, 2007

(86) PCT No.: PCT/FR2007/050649
§ 371 (c)(1),
(2), (4) Date: Jul. 16, 2008

(87) PCT Pub. No.: WO2007/083059
PCT Pub. Date: Jul. 26, 2007

(65) Prior Publication Data
US 2010/0156331 A1    Jun. 24, 2010

(30) Foreign Application Priority Data

Jan. 20, 2006   (FR) ..................................... 06 00534

(51) Int. Cl.
*H02P 6/16* (2006.01)
(52) U.S. Cl. .............. 318/400.04; 318/400.01; 318/729; 318/809; 318/438; 318/722

(58) Field of Classification Search ............. 318/400.01, 318/438, 722, 756, 729, 809, 400.04
See application file for complete search history.

(56) References Cited

U.S. PATENT DOCUMENTS

| 3,999,108 | A | | 12/1976 | Tanikoshi | |
|---|---|---|---|---|---|
| 4,271,385 | A | | 6/1981 | Azusawa | |
| 4,888,533 | A | * | 12/1989 | Gotoh et al. | 318/524 |
| 5,838,123 | A | | 11/1998 | Zhao | |
| 6,002,234 | A | | 12/1999 | Ohm et al. | |
| 6,020,700 | A | * | 2/2000 | Tien | 318/400.38 |
| 6,313,601 | B1 | * | 11/2001 | Kubo et al. | 318/799 |
| 6,954,042 | B2 | * | 10/2005 | Lee et al. | 318/400.38 |
| 7,187,154 | B2 | * | 3/2007 | Ta et al. | 318/799 |

* cited by examiner

*Primary Examiner* — Bentsu Ro
*Assistant Examiner* — David S Luo
(74) *Attorney, Agent, or Firm* — Berenato & White, LLC

(57) ABSTRACT

A device for controlling a polyphase rotating machine, the machine comprising a stator, a rotor, and sensors, the device being capable of receiving: at least one first sensing signal (U; V; W) representing a position of the rotor relative to the stator and output by a first sensor; and a second sensing signal (V; W; U) representing the position and phase-shifted relative to the first signal and output by a second sensor. The control device comprises: means (K, R) for combining the first and second sensing signals into a combined signal, the means including at least one controlled switching element capable adopting at least in two states, the combined signal being based on a state of the first element and enabling the machine to be controlled.

14 Claims, 4 Drawing Sheets

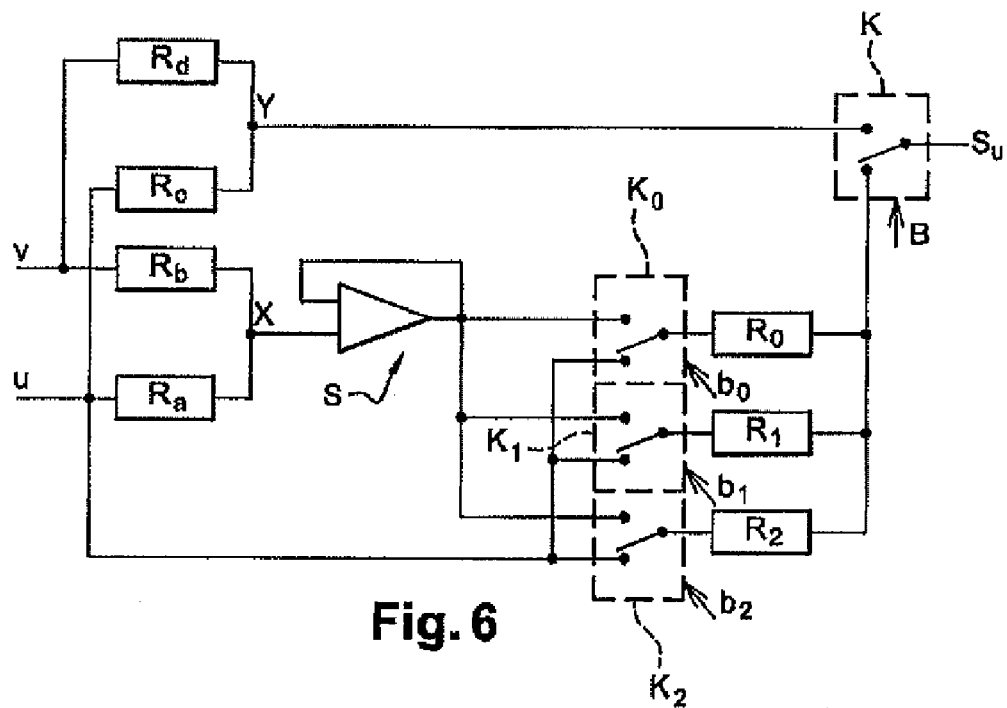
Fig. 6
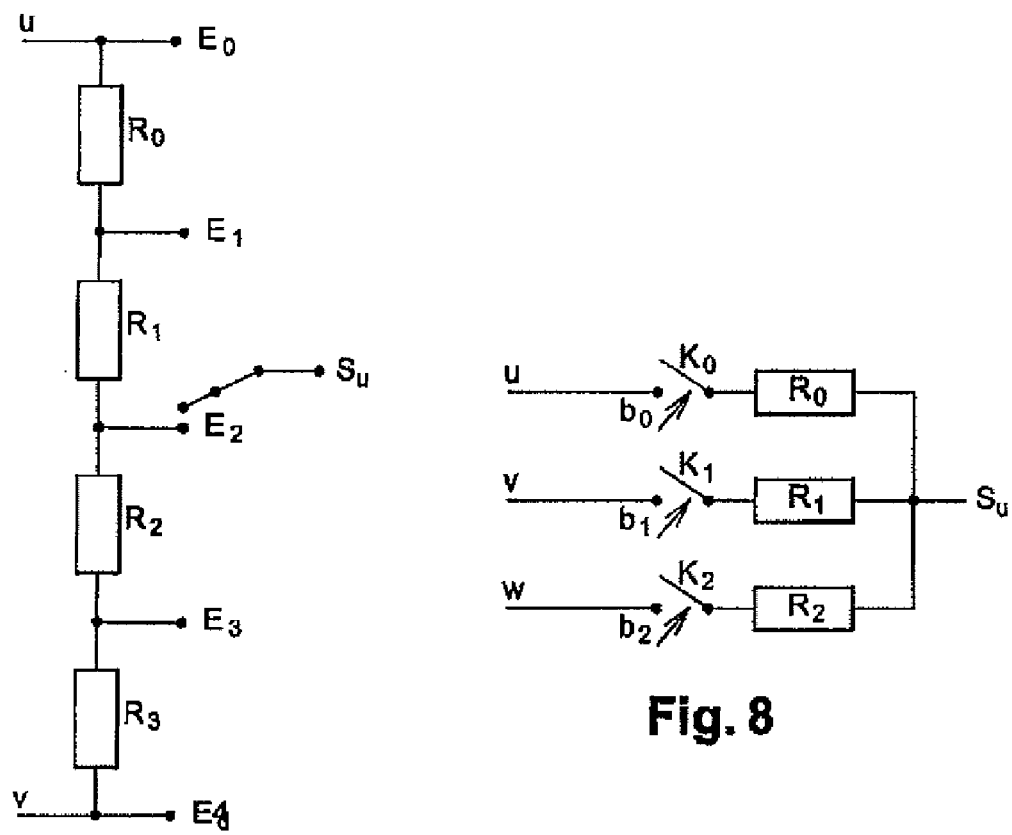
Fig. 7
Fig. 8

DEVICE FOR CONTROLLING POLYPHASE ROTATING MACHINE

CROSS-REFERENCE TO RELATED APPLICATIONS AND CLAIM TO PRIORITY

This application relates to International Application No. PCT/FR2007/050649 filed Jan. 15, 2007 and French Patent Application No. 0600534 filed Jan. 20, 2006, of which the disclosures are incorporated herein by reference and to which priority is claimed.

FIELD OF THE INVENTION

The invention concerns a circuit for controlling a polyphase rotary electrical machine, possibly reversible as in the case of alternator starters.

PRIOR ART

A rotary electrical machine conventionally comprises a rotor and a stator. One of these elements has a direct current passing through it and thus generates a constant magnetic field of fixed orientation with respect to this element. The other element comprises a plurality of distinct windings angularly spaced apart; each winding has a current passing through it offset in phase with respect to that of the other winding so as to create a rotating magnetic field. The co-existence of the fixed-orientation field of the first element and the rotating field of the second element causes the rotation of these elements with respect to each other, that is to say the rotation of the rotor with respect to the stator.

The different currents are generally injected into the windings of the polyphase element through a bridge formed by power switches (in general diodes associated with power transistors).

This power bridge is in general controlled by an electronic module that fixes the opening and closing times of the switches and thus controls the phase of the various currents through the windings.

In order to determine the switch control times, the electronic module normally uses signals representing the position of the rotor with respect to the stator, such as for example position sensors regularly distributed over the circumference of the rotary machine, which each send periodic frequencies at the rotation frequency of the rotor and offset in phase with respect to one another.

In the case where the rotary electrical machine is reversible, the power bridge fulfils the role of a bridge rectifier during the functioning of the machine in alternator mode.

For the purpose of approaching an optimum torque over a wide range of rotation speeds, the document WO 2004/100351 proposes to process the signals issuing from the sensors by weighting and adding, in practice by means of an analogue filtering circuit, which makes it possible to achieve phase offsets continuously variable over the entire range of rotation speeds.

However, according to this solution, the phase difference is determined according to the speed by the components of the analogue circuit. The offset/speed relationship is therefore fixed and can therefore in particular not be adapted to the various situations that may be encountered (starting, dynamic assistance, etc). In addition, the choice of this relationship lacks flexibility since it is determined according to the circuit elements used and therefore is not very adaptable to other electrical machines, for example with different sizes. This design also involves the use of an analogue circuit with particular characteristics for each type of machine that it is wished to manufacture, which complicates the manufacture of the machines on an industrial level.

OBJECT OF INVENTION

To avoid these problems and thus afford in particularly greater flexibility in the phase offsetting of the signals issued from the sensors, the invention proposes a device for controlling a polyphase rotary electrical machine, the said machine comprising a stator, a rotor and sensors, the said device being able to receive:
  at least a first sensor signal representing a position of the rotor with respect to the stator and delivered by a first sensor, and
  a second sensor signal representing the said position and offset in phase with respect to the first signal and delivered by a second sensor.

In accordance with the invention, the control device comprises:
  means for combining the first and second sensor signal in a combined signal, the said means comprising at least one controlled switching element able to take at least two states, the combined signal being a function of a state of the first element and making it possible to control the said machine.

It is thus possible easily to give the phase offset of the combined signal a plurality of values through the choice of the signals transmitted by the first and second elements.

According to non-limitative embodiments, the device according to the invention can comprise one or more of the following characteristics;
  the first switching element has a conductive state for transmitting a signal and an open state for stopping a signal transmission;
  the first switching element has at least two conductive states for selectively transmitting one signal among several;
  the control device is able to receive as an input a number of sensor signals equal to the number of phases of the machine;
  the control device is able to receive as an input a number of sensor signals different from the number of phases of the machine;
  the combination means also contrive means of weighting the sensor signals;
  the weighting means comprises at least one resistor;
  the combination means comprises a plurality of switching elements;
  the control device cooperates with a control circuit comprising an input stage able to receive the sensor signals;
  the control device cooperates with a control circuit comprising a microprocessor able to control at least one switching element;
  the microprocessor is able to control the switching element according to information representing the rotation speed of the machine.

The invention also proposes a polyphase rotary electrical machine, for example an alternator starter, with such a control device.

BRIEF DESCRIPTION OF THE FIGURES

Other characteristics and advantages of the invention will emerge in the light of the following description, given with reference to the accompanying drawings, in which:

FIGS. 3 to 8 depict possible non-limitative embodiments of a mixing circuit of a phase lead unit of FIG. 2a or 2b.

DETAILED DESCRIPTION OF NON-LIMITATIVE EMBODIMENTS OF THE INVENTION

Figure 1:
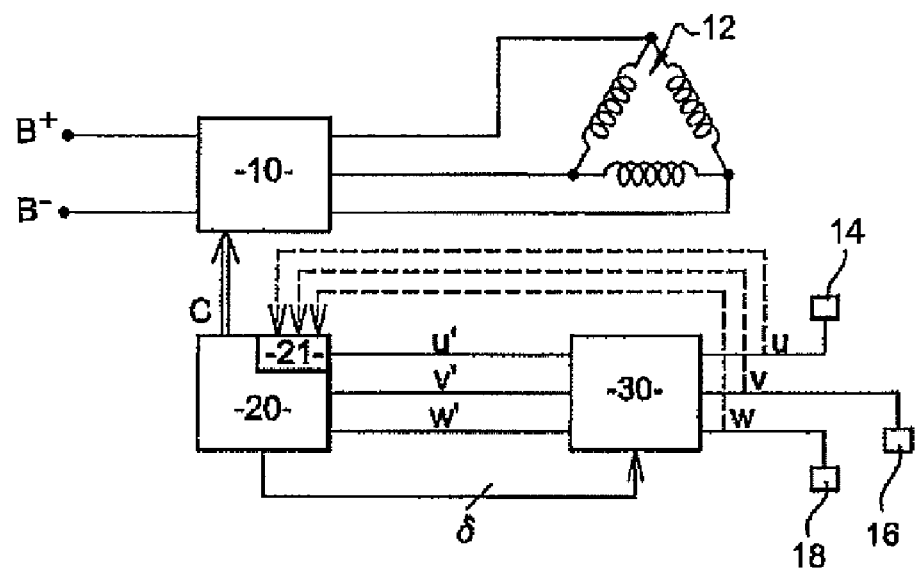
FIG. 1 depicts the elements of a polyphase rotary electrical machine and its control, the control comprising a phase lead unit.

FIG. 1 depicts the main elements of a polyphase rotary electrical machine, for example reversible of the alternator starter type, as well as its control.

FIG. 1 presents a non-limitative example of a three-phase rotary electrical machine with three position sensors.

Such a control comprises a power bridge 10 that, in motor mode, supplies the phases of a stator 12, in this non-limitative example three phases, from a voltage generated between the two terminals B$^+$, B$^-$ of a supply battery.

The power bridge 10 is formed by switches (not shown) that are controlled by control signals C so that the various windings of the stator 12 have signals passing through them offset by 120° with respect to one another in this example.

In this non-limitative example, three sensors exist. The three linear sensors 14, 16, 18 are non-limitatively equally distributed over 360° electrical and generate sensor signals U, V, W. These signals are processed by a control device called a phase lead unit 30 that delivers three digital signals U', V', W' corresponding to the sensor signals U, V, W with a phase lead δ with respect to these.

The digital signals U', V', W' generated by the phase lead unit 30 are used by a control circuit 20 to form the control signals C of the power bridge 10.

The control circuit 20 also generates a phase lead instruction δ. To do this, the control circuit comprises for example a microcontroller (including a microprocessor) that determines the rotation speed of the machine on the basis of the sensor signals U, V, W or on the basis of the digital signals U', V', W' and which derives there from the phase offset δ to be used, possibly also a function of other conditions, such as the operating phase of the machine for example motor mode (starting phase or high-speed dynamic assistance), transition from motor mode to generator mode) or a torque value. In this non-limitative example, the offset δ is therefore associated with a given speed and operating condition and is for example stored within the microcontroller in a look-up table. For this purpose, the control circuit comprises an input stage 21 able to receive the sensor signals U, V, W or the digital signals U', V', W.

When the machine functions in alternator mode, also referred to as generator mode, the power bridge 10 fulfils the role of a bridge rectifier that transmits energy from the machine (and in particular from the stator 12) to the battery (terminal B$^+$, B$^-$).

Figure 2A:
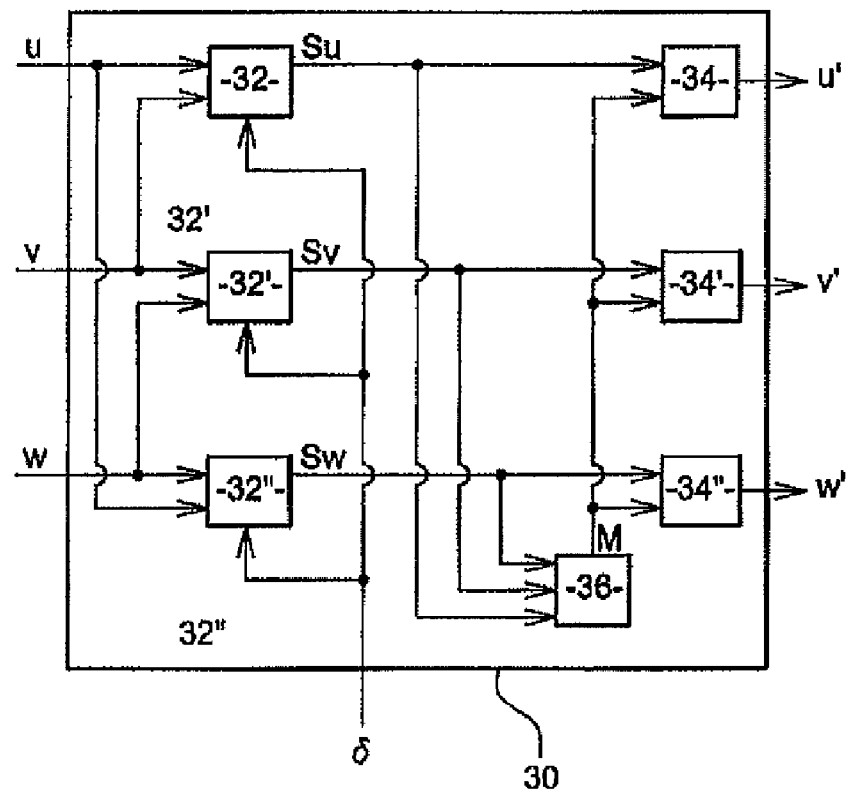
FIG. 2a depicts a first non-limitative embodiment of the phase lead unit of FIG. 1.

A first non-limitative example embodiment of the phase lead unit 30 is now described with reference to FIG. 2a.

The phase lead unit 30 of FIG. 2 comprises three so-called "mixing" circuits 32, 32', 32", which each receive as an input a signal issuing from a sensor (the signal U for the mixing circuit 32) and the signal in phase lead by 120° with respect to it (the signal V for the mixing circuit 32).

Each mixing circuit combines the signals that it receives as an input (signals U and V for the mixing circuit 32), with a weighting that depends on the control signal δ generated by the control signal 20 and representing the required phase lead.

The signal combined and generated at the output of each mixing circuit 32, 32', 32" (signal respectively designated $S_u$, $S_v$, and $S_w$) is applied to a first input of a hysteresis comparator 34, 34', 34". The combined signals $S_u$, $S_v$, and $S_w$ are also applied to a circuit 36 that forms a signal M representing the average of these signals, which is applied to the second input of each of the hysteresis comparators 34, 34', 34".

In this way there is obtained at the output of each of the hysteresis comparators 34, 34', 34" the signals U', V', W' intended for the control circuit 20 that correspond to the signals U, V, W with the required phase advance. The use of the hysteresis comparators and the average M makes it possible to dispense with the voltage difference, called the voltage offset, of the combined signals $S_u$, $S_v$, and $S_w$.

Figure 2B:
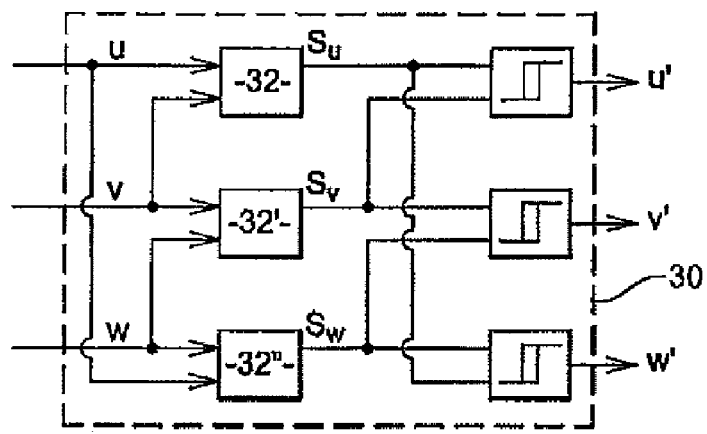
FIG. 2b depicts a second non-limitative embodiment of the phase lead unit of FIG. 1.

In a second non-limitative example illustrated in FIG. 2b, the phase lead unit 30 comprises three so-called "mixing" circuits 32, 32', 32" that each receive as an input a signal issuing from a sensor (the signal U for the mixing circuit 32) and the signal in phase lead of 120° with respect to it (the signal V for the mixing circuit 32).

Each mixing circuit proceeds with a combination of the signals that it receives as an input (signals U and V for the mixing circuit 32), with a weighting that depends on the control signal δ generated by the control circuit 20 and representing the required phase lead.

The combined signal generated as an output of each mixing circuit 32, 32' 32" (the signal respectively designated $S_u$, $S_v$, $S_w$) is applied to a first input of a hysteresis comparator 34, 34', 34". To the second input of a hysteresis comparator 34, 34', 34" there is applied a combined signal $S_y$ difference from the one that is applied to the first input. This allows a comparison between signals $S_u$ and $S_v$ that is more robust faced with parasitic interference since the amplitude between the said signals is greater than in the first embodiment.

In this way there are obtained at the output of each of the hysteresis comparators 34, 34', 34" the signals U', V', W' intended for the control circuit 20 and that correspond to the signals U, V, W with the required phase lead. The use of the hysteresis comparators makes it possible to dispense with the voltage offset of the combined signals $S_u$, $S_v$, $S_w$.

In a variant, at the second input, it is possible to apply the signal $(S_u+S_w)/2$. In this way there are obtained at the output of each of the hysteresis comparators 34, 34', 34" the signals U', V', W' intended for the control circuit 20 and that correspond to the signals U, V, W with the required phase lead. The use of the hysteresis comparators makes it possible to dispense with the voltage offset of the combined signals $S_u$, $S_v$, and $S_w$.

Figure 2C:
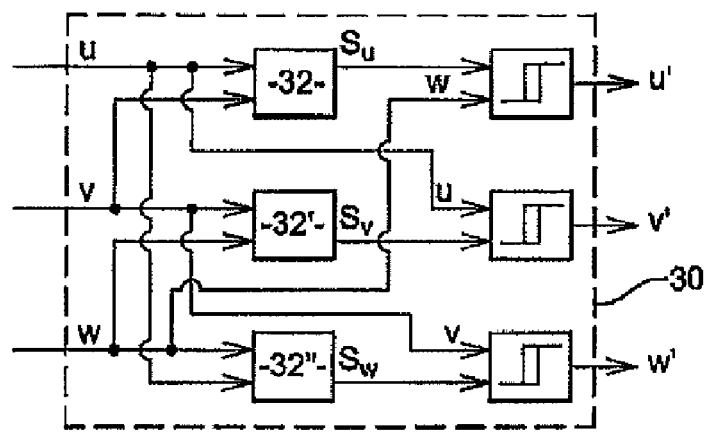
FIG. 2c depicts a third non-limitative embodiment of the phase lead unit of FIG. 1.

According to a third non-limitative embodiment illustrated in FIG. 2c, at the first input of a comparator a combined signal, for example $S_u$, is sent, and at the second input a sensor signal W different from the two signals that serve to fabricate the combined signal is sent. This makes it possible to have phase offsets of 60° instead of 120° in order to control the machine.

Figure 2D:
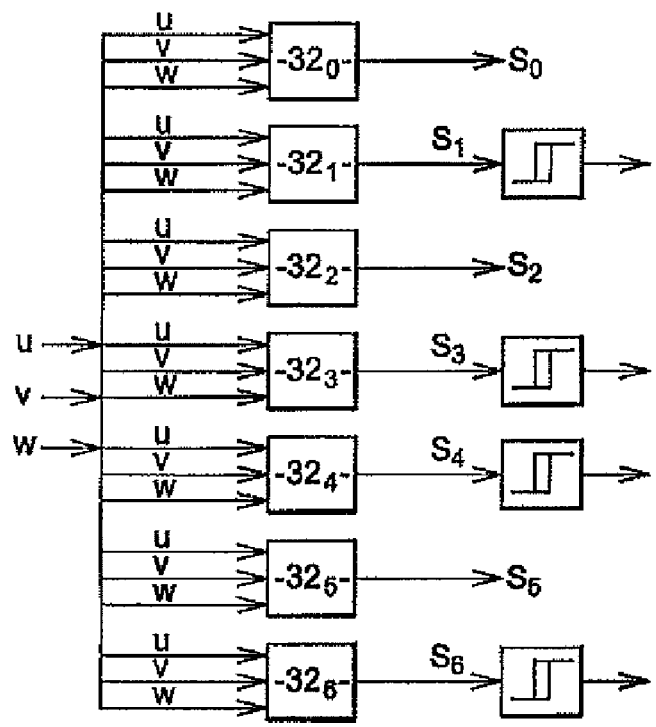
FIG. 2d depicts a fourth non-limitative embodiment of the phase lead unit of FIG. 1.

According to a fourth non-limitative embodiment illustrated in FIG. 2d, the phase lead unit 30 still comprises three so-called "mixing" circuits 32, 32', 32", which each receive as an input a signal issuing from a sensor (the signal U for the mixing circuit 32) and the signal in phase lead of 120° with respect to it (the signal V for the mixing circuit 32).

Each mixing circuit proceeds to combine the signals that it receives as an input (signals U and V for the mixing circuit 2), with a weighting that depends on the control signal δ generated by the control circuit 20 and representing the required phase lead.

The signals combined and generated at the output of each mixing circuit 32, 32', 32" (the signal respectively designated $S_u$, S, and $S_W$) are used to generate a greater number of processed signals ST, have seven signals ST1, ST2, ST3, ST4, ST5, ST6, ST7. There exist seven hysteresis comparators. At one input of a comparator, one of the processed signals ST1 is applied for example, and at the other input one of the combined signals $S_u$, $S_v$, or $S_w$ is applied, chosen so that the amplitude of the difference between two inputs is maximum and the output signals of the comparators are equally distributed over an electrical period (2π/7). It is possible to use a logic inverter to dispense with the problems of impedance matching between the elements of the mixing circuits and the comparators.

A description will now be given with reference to each of FIGS. 3 to 8 of various possible embodiments for implementing the mixing circuits 32, 32', 32". On each occasion the example will be presented as an application of the mixing circuit 32 that receives the signals U and V as an input; naturally these solutions are also applicable identically to the mixing circuits 32' and 32" and that each receive respectively as an input the signals V and W and W and U.

Figure 3:
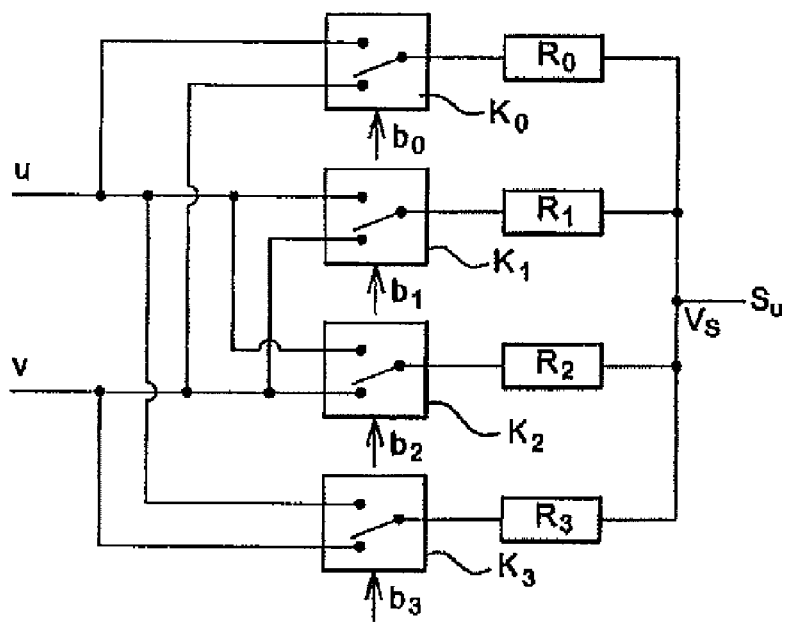

In a first example shown in FIG. 3, the mixing circuit 32 comprises a predetermined number of switches $K_i$ (here four switches $K_0$, $K_1$, $K_2$, $K_3$) which each receive the signal U at a first input and the signal V at a second input.

Each switch $K_i$ is controlled by one of the bits $b_i$ of the logic word corresponding to the phase lead instruction δ, also called the command δ, so as to selectively deliver as an output either the signal received at the first input (signal U in the case described here) or the signal received at the second input (signal V in the case study here). Therefore, in this example, a switch is dual-position.

The output of each switch $K_i$ is also connected to the output of the mixing circuit 32 (which carries the signal $S_u$) by means of a resistor $R_i$ that allows, as will appear subsequently, a weighting of the signal selected by the switch K (as a function of the control of the bit $b_i$) in the output signal $S_u$.

This is because, taking the example where the mixing circuit comprises four switches $K_i$ and the control word δ consequently comprises four bits $b_0$ to $b_3$ (as shown in FIG. 3), the voltage $V_s$ on the node common to the four resistors $R_0$, $R_1$, $R_2$, $R_3$ (which therefore forms the signal $S_u$) is equal to:

$$V_S = \frac{V_3 \cdot R_2 \cdot R_1 \cdot R_0 + V_2 \cdot R_3 \cdot R_1 \cdot R_0 + V_1 \cdot R_3 \cdot R_2 \cdot R_0 + V_0 \cdot R_3 \cdot R_2 \cdot R_1}{R_0 \cdot R_1 \cdot R_2 + R_0 \cdot R_1 \cdot R_3 + R_0 \cdot R_2 \cdot R_3 + R_1 \cdot R_2 \cdot R_3}$$

where the voltage $V_i$ corresponds to the voltage output from the switch $K_i$ and is therefore equal to U or V depending on the input selected on this switch by the bit $b_i$.

It can thus easily be seen that, by using different resistors in pairs and because of the linearity of the sensors (i.e. which deliver a linear sensor signal), the combination of the signals selected by the various switches K and weighted by the various resistors $R_i$ makes it possible to obtain a combined signal $S_u$ whose phase lead with respect to the signal U can take a plurality of values (here sixteen values=$2^4$) between 0° and 120° (phase lead of the signal V) according to the value of the control word δ.

Figure 4:
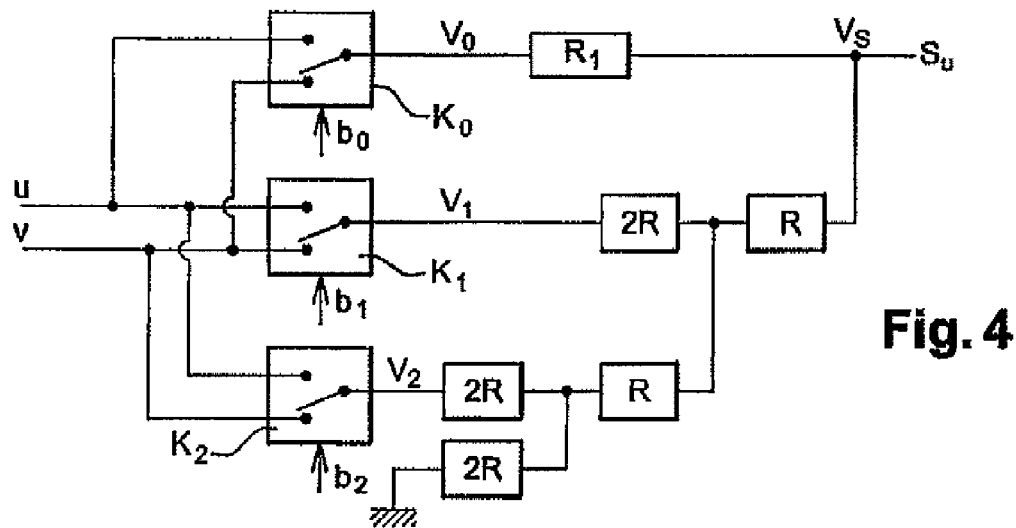

In a second example shown in FIG. 4, the mixing circuit comprises a plurality of switches $K_i$ (here three switches $K_0$, $K_1$, $K_2$) connected to a network of the type R-2R.

Precisely, the output of each switch $K_i$ is connected to a terminal of a resistor of resistance 2R. The opposite terminals of each of these resistors associated with a switch $K_i$ are connected to the opposite terminal of a resistor associated with the switch $K_{i+1}$ by means of a resistor of resistance R. The resistor associated with the output of the last switch (here $K_2$) is also connected to earth by means of a resistor of resistance 2R.

This solution, which functions according to the same principles as the first example illustrated in FIG. 3 makes it possible to obtain, on the terminal of the resistor associated with the switch $K_0$ opposite to this, a signal $S_u$ whose phase offset with respect to the signal U can take a plurality of values between zero and the offset of the signal V with respect to the signal U (here 120°).

By virtue of the particular construction of the circuit R-2R used, the offset values that it is possible to obtain by appropriate control of the various bits $b_0$, $b_1$, $b_2$ are also regularly distributed over the aforementioned angular range (here from 0° to 120°).

The voltage $V_s$ that therefore forms the signal $S_u$ is equal to:

$$V_s = \tfrac{1}{2}V_0 + \tfrac{1}{4}V_1 + \tfrac{1}{8}V_2$$

Figure 5:
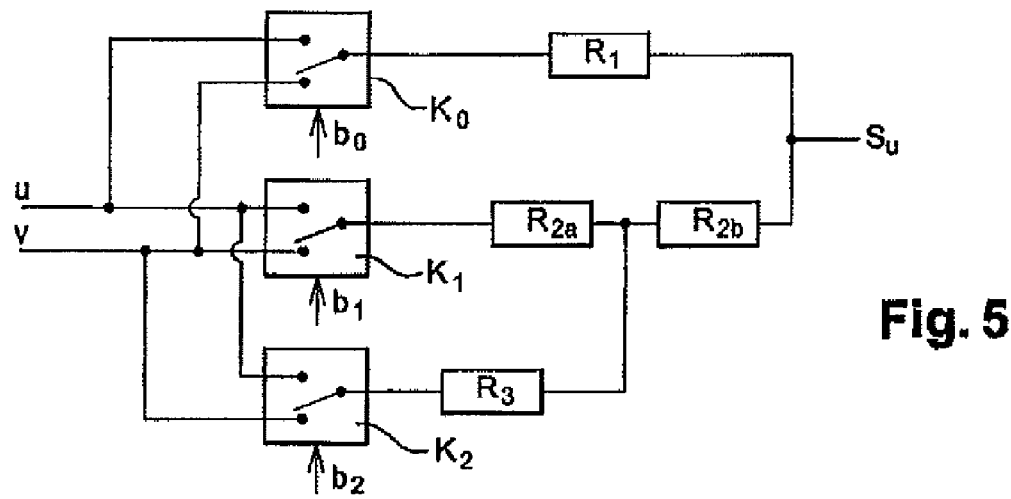

FIG. 5 depicts a third example of a mixing circuit 32 that combines the use of a plurality of resistance values and a series/parallel resistive bridge structure, which allows greater freedom in the choice of the phase offset values.

The construction used in FIG. 5 gives in fact for the value of the voltage $V_s$ (which corresponds to the combined signal $S_u$):

$$V_S = \frac{V_1 \cdot [R_{2a} \cdot R_3 + R_{2b} \cdot R_{2a} + R_{2b} \cdot R_3] + V_2 \cdot R_1 \cdot R_3 + V_3 \cdot R_1 \cdot R_{2a}}{R_{2a} \cdot R_3 + R_{2b} \cdot R_{2a} + R_{2b} \cdot R_3 + R_1 \cdot R_{2a} + R_1 \cdot R_3},$$

where the values $V_1$, $V_2$, $V_3$ each equal U or V respectively according to the value of the bits $b_0$, $b_1$, $b_2$ of the control word δ.

FIG. 6 depicts a fourth example of a mixing circuit 32.

In this example, the sensor signals U and V are firstly weighted respectively by means of a resistor of resistance $R_a$ and a resistor of resistance $R_b$ and then combined in a signal X, the values of the resistances $R_a$ and $R_b$ being chosen so that the phase of the signal X is in advance by 60° with respect to the signal U (it being recalled that the signal V is in advance by 120° with respect to the signal U).

Moreover the signals U and V are, according to the same principle, weighted respectively by resistors of resistance $R_c$ and $R_d$ and then combined in a signal Y whose phase lead is equal to 90° with respect to the signal U.

The signal X is applied through a follower circuit S to the second input of switches $K_0$, $K_1$, $K_2$ of a circuit of the type presented previously in FIG. 3, the first inputs of these same switches $K_0$, $K_1$, $K_2$ receiving the signal U.

Each of the switches $K_0$, $K_1$, $K_2$ generates as an output one of the two signals that it receives as an input (here the signal U of the signal X) according to the control bit (respectively $b_0$, $b_1$, $b_2$ for the switches $K_0$, $K_1$, $K_2$) of the control word δ representing the required offset. These switches are therefore dual position.

The signals issuing from each of the switches $K_0$, $K_1$, $K_2$ are weighted by means of a resistor (respectively of resistance $R_0$, $R_1$, $R_2$) and then combined: thus a signal is obtained after combination whose phase offset can take a plurality of values according to the control bits $b_0$, $b_1$, $b_2$ lying with respect to the phase of the signal U between 0° and 60° (phase difference of the signal X with respect to the signal U).

The signal thus combined is applied to an input of a switch K that receives at another input the signal Y previously mentioned (the phase difference of which is equal to 90° with respect to the signal U). The switch K is controlled by a control bit B that thus makes it possible to choose to emit as an output of the switch K a signal $S_u$ that corresponds either to the signal Y offset in phase by 90°, or to the signal whose phase offset is determined by the control bits $b_0$, $b_1$, $b_2$ and lying between 0° and 60°.

The mixing circuit that has just been presented thus makes it possible to obtain as an output a signal $S_u$, whose phase lead with respect to the signal U can take a plurality of values between 0° and 90°, including several values distributed between 0° and 60° (which is useful for the control of the torque at low rotation speeds) and a single value at 90° (useful mainly for maximising the torque at high speed. The phase offset values that it is possible to obtain are thus distributed according to requirements, in particular in the zones of the angular range where the variation in the offset has significant consequences on the torque of the machine. There is thus a greater freedom in the distribution of the phase offset values than it is possible to obtain by virtue of the mixing circuit.

In a fifth example illustrated in FIG. 7, the sensor signals U and V are connected to each other by several resistors connected in series, here resistors R1, R2, R3 and R4. Between two adjacent resistors there is a node Ei (i=0 to 4) connected to the input of a multi-position switch, here five positions. According to the logic control word δ the multi-position switch has one of its inputs Ei connected to the output of the mixing circuit $S_u$.

In the examples that have just been seen, the switches are dual position, namely they comprise at least two conductive states for selectively transmitting one signal among several.

In the following example, the switches are simple switches, namely they have a conductive state making it possible to transmit a signal and an open state for stopping a signal transmission.

In a sixth example illustrated in FIG. 8 the mixing circuit comprises three simple switches $K_o$, $K_1$, $K_2$. The output of each switch Ki is connected to the terminal of a resistor Ri. The output terminal of each resistor Ri is connected in a node constituting the output of the mixer. According to the value of the logic control word of the phase lead δ a switch $K_0$ ($K_1$, $K_2$) transmits the sensor signal U (V, W) to the input terminal of the resistor or no signal. The output signal $S_u$ is the resultant of all the voltages at the input of the resistors, the said voltages depending on the logic control word.

The embodiments that have just been described constitute only possible examples of implementation of the invention.

The invention claimed is:

1. A device for controlling a polyphase rotary electrical machine, said machine comprising a stator, a rotor, a first sensor producing a first sensor signal (U; V; W) representing a position of the rotor with respect to the stator and a second sensor producing a second sensor signal (U; V; W) representing the position and offset in phase with respect to the first sensor signal;

said control device producing at least one digital control signal (U', V', W') corresponding to one of said first and second sensor signals (U, V, W) with a required phase lead δ with respect thereto;

said control device comprising means (K, R) including at least one controlled switching element ($K_0$, $K_1$, $K_2$, $K_3$) and provided to receive:
a the first sensor signal (U; V; W), and
the second sensor signal (V; W; U);

said means (K, R) provided for combining the first and second sensor signals into a combined signal ($S_u$; $S_v$; $S_w$), said at least one controlled switching element ($K_0$, $K_1$, $K_2$, $K_3$) taking at least two states, the combined signal ($S_u$; $S_v$; $S_w$) being a function of a state of said at least one controlled switching element and making it possible to control said polyphase rotary electrical machine.

2. The control device according to claim 1, wherein the at least one controlled switching element has a conductive state for transmitting a signal and an open state for stopping a signal transmission.

3. The control device according to claim 1, wherein the at least one controlled switching element has at least two conductive states for selectively transmitting one signal among several.

4. The control device according to claim 1, wherein said device is able to receive as an input a number of sensor signals equal to the number of phases of the machine.

5. The control device according to claim 1, wherein said control is able to receive as an input a number of sensor signals different from the number of phases of the machine.

6. The control device according to claim 1, wherein said means for combining also comprise means ($R_0$, $R_1$, $R_2$, $R_3$; 2R; $R_1$, $R_2$a, $R_3$) of weighting the sensor signals.

7. The control device according to claim 6, wherein the weighting means comprises at least one resistor.

8. The control device according to claim 1, wherein the means for combining comprise of a plurality of controlled switching elements ($K_0$, $K_1$, $K_2$, $K_3$).

9. The control device according to claim 1, wherein said device further cooperates with a control circuit (20) comprising an input stage (21) able to receive the sensor signals.

10. The control device according to claim 1, wherein said device further cooperates with a control circuit (20) comprising a microprocessor able to control said at least one switching element ($K_0$, $K_1$, $K_2$, $K_3$).

11. The control device according to claim 10, wherein the microprocessor is able to control the at least one switching element according to information representing the rotation speed of the polyphase rotary electrical machine.

12. A polyphase rotary electrical machine, comprising a control device (30) according to claim 1.

13. An alternator starter, comprising a control device (30) according to claim 1.

14. The control device according to claim 1, further comprising at least one hysteresis comparator receiving said combined signal ($S_u$; $S_v$; $S_w$) from said means (K, R) and generating said at least one digital control signal (U', V', W').

* * * * *